Aug. 12, 1958 — H. A. SMITH — 2,847,143
MECHANICAL CONNECTION
Filed Nov. 26, 1956
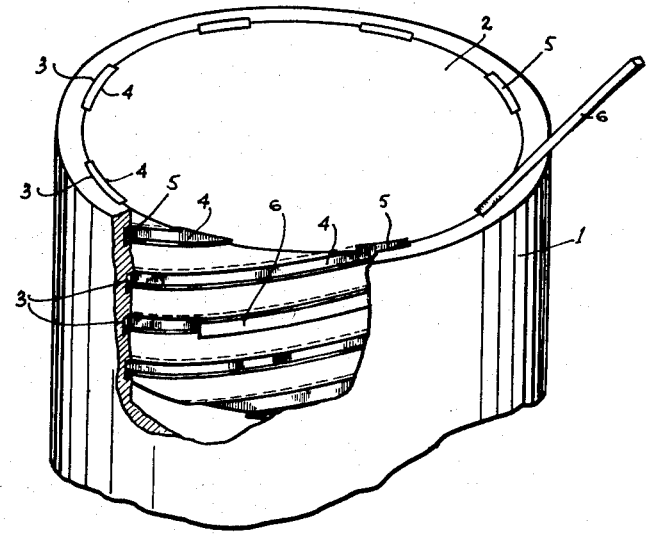
Inventor
Harold A. Smith
by Stevens, Davis, Miller & Mosher
his attorneys United States Patent Office 2,847,143
Patented Aug. 12, 1958

2,847,143

MECHANICAL CONNECTION

Harold A. Smith, Deep River, Ontario, Canada, assignor to Atomic Energy of Canada Limited, Ottawa, Ontario, Canada Application November 26, 1956, Serial No. 624,314

Claims priority, application Canada December 21, 1955

1 Claim. (Cl. 220—55)

This invention relates to a method of mechanically fastening a closure member to a vessel. In particular the invention has been developed with a view to furnishing a convenient method of securing an end closure to a cylindrical vessel when the parts are massive and especially difficult to handle.

The present invention is not intended to provide a fluid-tight seal between the closure member and the shell of the vessel. If a fluid-tight seal is required, it can be provided by conventional sealing means fixed externally to the vessel and closure member. The function of the closure member is to provide a mechanically strong device for holding the fluid-tight sealing means in position, and to act as a rigid and firm support for any parts that may be required to extend through the closure member into the vessel.

In the past, the attachment of end closure members to cylindrical vessels has been by one or other of four main methods. The first method employs registering external flanges on the closure member and the vessel, with fastening bolts or studs passing through holes in the two flanges. This method is only satisfactory when the diameter of the vessel is within a certain maximum value, because it is found that the flanges can only be made a certain size beyond which the space required for the bolts limits the fastening capacity. Moreover, the size of the flanges themselves produces a large increase in the overall diameter and the space requirement for the whole assembly. In addition a considerable amount of material is used, and it is not easy in practice to establish the correct holding pressure at all points around the periphery of the joint.

The second method in common use today employs similar external flanges on the closure member and vessel, with fastening C-shaped pieces clamped over and secured to the flanges. This method of fastening has similar disadvantages to the first-mentioned method.

The third method of securing closure members to vessels is by means of ordinary or interrupted screw threads. In either case this requires rotation of the closure member relatively to the vessel which makes assembly very difficult in the case of massive parts.

Finally, it is possible to weld the parts together, but this is unsuited to the type of apparatus that may be expected to require even occasional disassembly and reassembly during its lifetime. Moreover it is costly and not always practical with the materials involved.

The present invention consists of an assembly of a cylindrical vessel and an internally fitting complementary end closure member therein having a planar outer surface flush with an end of the cylindrical vessel, comprising a plurality of keyways formed in the internal peripheral surface of said vessel and a plurality of keyways formed in the external peripheral surface of said closure member, said keyways cooperating in pairs to form helically extending passageways each terminating in a port at said planar outer surface, and a plurality of keys each engaged in one of said passageways.

The invention is primarily applicable to truly cylindrical vessels and closure members therefor, but may have wider application to other "generally cylindrical" vessels, such as those of elliptical cross-section, or those formed as multi-sided polygons. The chief requirements will be that the closure member should have a periphery of complementary shape and that the passageways should have no changes of direction too sudden for successful insertion and withdrawal of the keys.

The accompanying drawing provides illustration of one form of the present invention; the figure shows a diagrammatic cutaway portion of a vessel and closure member secured thereto in accordance with the present invention.

Referring to the figure, a cylindrical vessel 1 has inserted in its open end a massive cylindrical closure member 2. This closure member makes a comparatively close fit with the inside of the end of the vessel 1, but not a fluid-tight connection. Closure member 2 has a planar outer surface flush with the end of the vessel 1. A plurality of pairs of corresponding keyways 3 and 4 are formed respectively in the vessel 1 and closure member 2. With proper positioning of the closure member 2 relatively to the vessel 1, the pairs of keyways 3 and 4 co-operate to form a series of helically extending passageways 5 each lying partly in the inner periphery of the vessel 1 and partly in the outer periphery of the closure member 2. Each passageway 5 terminates in a port at the planar outer surface of closure member 2. Into each of the passageways 5 there is inserted a key in the form of an elongated strip of flexible steel. For purposes of illustration only one such key 6 is shown partially inserted in the figure, but it is to be understood that similar keys will be inserted fully into each of the passageways 5. Thus, when it is desired to assemble the closure member 2 with the vessel 1, it is only necessary to insert such closure member in the end of the vessel in such a position that the pairs of keyways are in register with one another. No relative rotation of the parts is necessary. This is especially important when the parts are massive.

When a small helix angle is chosen, the frictional forces between the parts will prevent slipping of the key-to-keyway surfaces. For larger helix angles, it may be necessary to prevent the head rotating in the pressure vessel by suitable additional fastenings.

It is desired to stress that the method of establishing a mechanical connection in accordance with the present invention differs basically from prior methods in that the key is inserted after the closure member. A large number of systems has previously been proposed in which keys or other equivalent locking means are employed to hold a closure member in position. In these prior arrangements, however, the locking means are inserted before the closure member is put into place, and are, in some manner, moved to a locking engagement after the closure member has been placed in position. The present invention provides an important departure from this conventional method of employing a key, in that the key is now inserted after the closure member, such insertion forming the final step in the operation. The structural manifestation of this feature of the present invention is the provision of a port or other opening situated on the exterior of the assembly and communicating with the keyway whereby the key may be inserted after the closure member has been placed in its final position.

It is also important to appreciate that it is primarily this feature of the invention that enables a multiplicity of keys to be used so readily. The ability of distribute stress over a plurality of keys, and correspondingly more uniformly over the vessel and closure member, avoids the severe stress concentrations which would otherwise be experienced and which have in the past had to be overcome by other methods such as an increase in the quality and/or quantity of material employed.

I claim:

An assembly of a cylindrical vessel and an internally fitting complementary end closure member therein having a planar outer surface flush with an end of the cylindrical vessel, comprising a plurality of keyways formed in the internal peripheral surface of said vessel and a plurality of keyways formed in the external peripheral surface of said closure member, said keyways co-operating in pairs to form helically extending passageways each terminating in a port at said planar outer surface, and a plurality of keys, each engaged in one of said passageways.

References Cited in the file of this patent

UNITED STATES PATENTS

| | | |
|---|---|---|
| 738,503 | Waters | Sept. 8, 1903 |
| 1,045,277 | Girling | Nov. 25, 1912 |
| 2,038,871 | Mueller et al. | Apr. 28, 1936 |
| 2,436,407 | Stephens | Feb. 24, 1948 |
| 2,645,513 | Sterrett | July 13, 1953 |

FOREIGN PATENTS

| | | |
|---|---|---|
| 1,050,530 | France | Sept. 2, 1953 |